(12) United States Patent
Kim

(10) Patent No.: US 6,380,543 B1
(45) Date of Patent: Apr. 30, 2002

(54) THIN FILM TRANSISTOR TYPE X-RAY IMAGE DETECTING DEVICE AND METHOD FOR FABRICATING THE SAME

(75) Inventor: Chang Won Kim, Seoul (KR)

(73) Assignee: LG. Philipa LCD Co., Ltd., Seoul (KR)

( * ) Notice: Subject to any disclaimer, the term of this patent is extended or adjusted under 35 U.S.C. 154(b) by 0 days.

(21) Appl. No.: 09/396,522

(22) Filed: Sep. 15, 1999

(30) Foreign Application Priority Data

Sep. 16, 1998 (KR) .......................................... 98-38159

(51) Int. Cl.⁷ ................................................ G01T 1/24
(52) U.S. Cl. ............................. 250/370.09; 250/370.08
(58) Field of Search ........................ 250/370.09, 370.08

(56) References Cited

U.S. PATENT DOCUMENTS 5,498,880 A * 3/1996 Lee et al. .............. 250/370.09
5,598,004 A * 1/1997 Powell et al. .......... 250/370.09

\* cited by examiner

Primary Examiner—Constantine Hannaher
Assistant Examiner—Ahdrew Israel
(74) Attorney, Agent, or Firm—Long Aldridge & Norman LLP

(57) ABSTRACT

A gate element is first formed on a substrate, then a gate insulating layer formed on the substrate while covering the gate element. After forming an ohmic contact layer on a portion of the gate insulating layer corresponding to the gate element, source and drain electrodes are formed on the ohmic contact layer simultaneously with forming a first common electrode on the gate insulating layer. Next, a storage capacitor layer is formed on the source and drain electrodes and the first common electrode, then first and second contact holes are respectively formed on a first portion of the storage capacitor layer corresponding to the drain electrode and a second portion of the storage capacitor layer the first common electrode, respectively. Finally, a sensing electrode and a second common electrode are formed on the storage capacitor layer such that the pixel and second common electrodes contact the drain electrode and the first common electrode through the first and second contact holes, respectively.

29 Claims, 5 Drawing Sheets

THIN FILM TRANSISTOR TYPE X-RAY IMAGE DETECTING DEVICE AND METHOD FOR FABRICATING THE SAME

This application claims the benefit of Korean Patent Application No. 1998-38159, filed on Sep. 16, 1998, which is hereby incorporated by reference.

BACKGROUND OF THE INVENTION

1. Field of the Invention

The present invention relates to to an X-ray image detecting device and, more particularly, to a thin film transistor (TFT) type X-ray image detecting device and a method for manufacturing the same.

2. Discussion of the Related Art

FIGS. 1 and 2 show a conventional TFT type image detecting device, which is disclosed in U.S. Pat. No. 5,498,880.

As shown in the drawings, arranged on a substrate 1 is a TFT 3 coupled to a storage capacitor 10 that is used for collecting charges. When the TFT 3 is switched by a scanning integrated circuit 4, charges stored in the storage capacitor 10 are directed to an integrated circuit 5.

An optical conductive layer 2 is deposited on the substrate 1 while covering all of the elements formed on the substrate 1. The optical conductive layer 2 is designed to form electron-hole pairs 6 (electric signals) in proportion to an intensity of an external signal such as an electric or magnetic wave. The optical conductive layer 2 functions as a converter for converting X-ray optical signals into electric signals. When charges formed by X-ray light are applied to a conductive electrode 7, a voltage Ev applied to the conductive electrode 7 causes the charges to be collected on a sensing electrode 8 formed under the optical conductive layer 2, and then stored in the storage capacitor 10.

In addition, when a voltage is applied to the TFTs 3 coupled to an M-number of gate wires, the charges stored in the storage capacitor 10 are directed to an external image system through an N-number of data wires. That is, the scanning integrated circuit 4 applies a voltage to the M-number of gate wires to turn On the TFTs 3, and the data integrated circuit 5 applies a voltage to the N-number of data wires to transmit the charges stored in the storage capacitor 10 to the external image system (see FIG. 2).

In the above described device, when the intensity of the X-ray light is low, it is very difficult to convert the X-ray light into charges. This problem can be overcome by reducing the trap density for trapping the charges within the optical conductive layer 2 and applying a large amount of vertical voltage (above $10V/\mu m$) between the conductive electrode 7 and the sensing electrode 8 to reduce the current generated by voltages other than the vertical voltage.

In addition, the charges generated on the optical conductive layer 2 by the X-ray light are also collected on a protecting layer 9 formed to protect a channel area 65 of the TFT 3. The charges collected on the protecting layer 9 are further directed to the channel area 65, making it difficult for the TFT to perform its switching-operation by generating leakage current even when the TFT is in an Off state. Furthermore, the leakage current causes the electric charges stored in the storage capacitor 10 to flow externally, making it impossible to display a desired image.

In addition, since the device has a "mushroom structure" in which the TFT 3 and the storage capacitor 10 are covered by the protecting layer 8, the electric potential is increased as the charges are collected in the storage capacitor 10. The increased electric potential causes the amount of a parasitic capacitance formed between the protecting layer 8 and the TFT 3 to be increased. The amount of the parasitic capacitance can be reduced by increasing the thickness of the protecting layer 8. However, if the thickness of the protecting layer 8 is increased, since a large amount of the charges are induced into the channel area 65, the leakage current is increased even when the TFT is in an Off state. By forming an organic insulating layer having a thickness of more than $2 \mu m$ on the storage capacitor 10, the amount of the parasitic capacitance also can be reduced. However, an additional time-consuming process for depositing the organic insulating layer is required, increasing manufacturing costs.

SUMMARY OF THE INVENTION

Accordingly, the present invention is directed to thin film transistor type X-ray image detecting device and method for fabricating the same that substantially obviates one or more of the problems due to limitations and disadvantages of the related art.

An object of the present invention is to provide a TFT type X-ray image detecting device with an improved switching operation by reducing a leakage current, thereby providing a clear image.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a method for fabricating an X-ray image detecting device, the method comprising: forming a gate element on a substrate; forming a gate insulating layer on the substrate while covering the gate element; forming an ohmic contact layer on a portion of the gate insulating layer corresponding to the gate element; forming source and drain electrodes on the ohmic contact layer simultaneously with forming a first common electrode on the gate insulating layer; forming a storage capacitor insulating layer on the source and drain electrodes and the first common electrode; forming first and second contact holes on a first portion of the storage capacitor insulating layer corresponding to the drain electrode and a second portion of the storage capacitor layer the first common electrode, respectively; and forming a sensing electrode and a second common electrode on the storage capacitor layer such that the sensing electrode and second common electrode contact the drain electrode and the first common electrode through the first and second contact holes, respectively.

The method may further comprise forming an optical conductive layer on the sensing electrode and second common electrode; and forming a conductive electrode on the optical conductive layer.

Preferably, forming the ohmic contact layer further comprises: forming a pure amorphous silicon semiconductor layer on the gate element; and forming an impurity-containing silicon semiconductor layer on the pure amorphous silicon semiconductor layer. The first and second common electrodes are grounded. The storage capacitor insulating layer may be made of an organic material or an inorganic material. Preferably, the inorganic material comprises a silicon nitride. Preferably, the optical conductive layer is made of an amorphous compound.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

FIGS. 3A to 3H illustrate, in cross-section, a portion of the above described X-ray image detecting device as it undergoes sequential processing steps for being manufactured.

First, a metal such as aluminium or an aluminium alloy is deposited on a substrate 50, then patterned to form a first metal layer 51. Next, a metal having a high melting point such as Mo, Ta, W, Nb or Sb is deposited on a first metal layer 51, and then patterned to form a second metal layer 52.

Figure 3A:
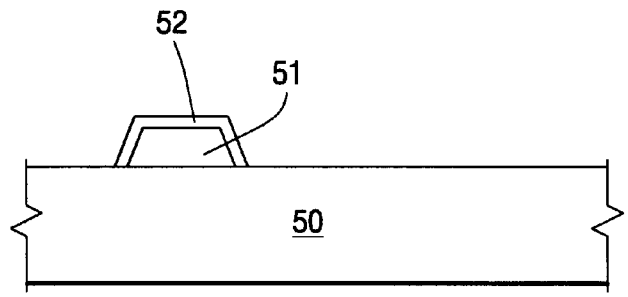
FIGS. 3A to 3H are sectional views for illustrating sequential processing steps for manufacturing a TFT type X-ray image detecting device according to a preferred embodiment of the present invention.

The first and second metal layers 51 and 52 are tapered in section through a photo-lithography process, thereby forming a gate element (see FIG. 3A).

Next, a gate insulating layer 54 is formed on the substrate 50 while covering the first and second metal layers 51 and 52. Preferably, the gate insulating layer 54 is about 2500–3000 Å and made of a suitable material such as SiNx, SiOx, BCB(BenzoCycloButene), or acryl.

Figure 3B:
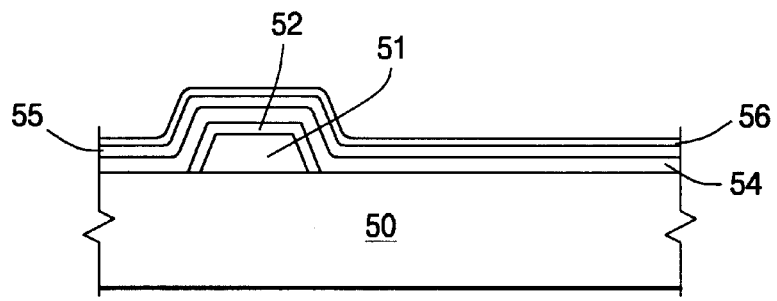

An intrinsic amorphous silicon semiconductor layer 55 and an impurity-containing amorphous silicon layer 56 are consecutively formed on the gate insulating layer 54 (see FIG. 3B).

Figure 3C:
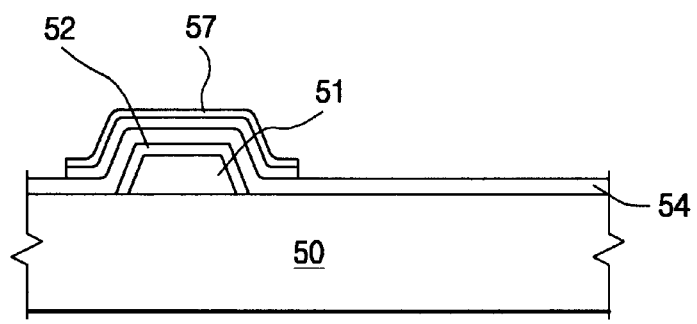
Figure 3D:
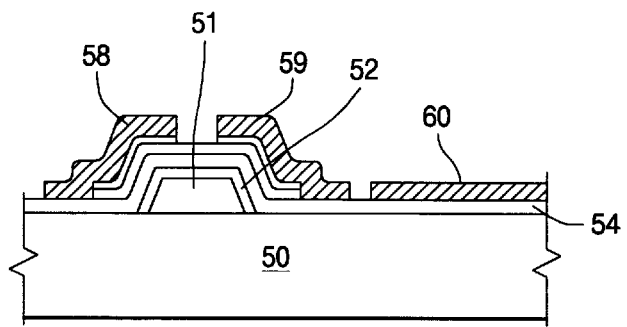

As shown in FIG. 3C, the intrinsic amorphous silicon semiconductor layer 55 and the impurity-containing amorphous silicon layer 56 are etched through a photolithography process to define an ohmic contact layer 57 which contacts a source electrode 58 and drain electrode 59 (see FIG. 3D).

After forming the ohmic contact layer 57, a suitable metal such as Cr or a Cr alloy is deposited on the gate insulating layer 54 and covers the ohmic contact layer 57, then is patterned through a lithography process to form source 58 and drain 59 electrodes and the first common electrode 60. Next, a portion of the impurity-containing amorphous silicon layer 56 is etched using the source 58 and drain 59 electrodes as a mask to define a transistor channel area (see FIG. 3D).

Figure 3E:
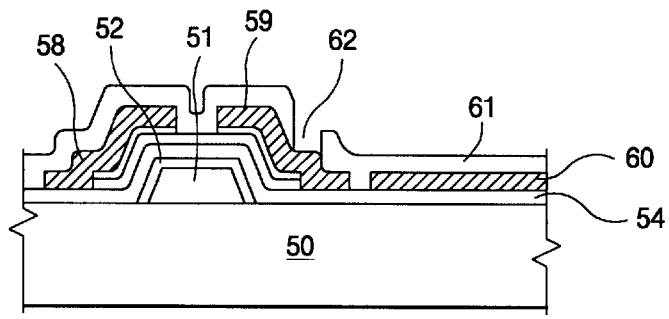

Next, a storage capacitor insulating layer 61 is deposited on the source 58 and drain 59 electrodes, the first common electrode 60, and the transistor channel (see FIG. 3E). Preferably, the insulating layer 61 is about 2500–3500 Å and made of a suitable material such as SiNx, SiOx or acryl resin.

Next, portions of the insulating layer 61 are removed through a masking process to form a first contact hole 62 and a second contact hole (not shown) (See FIG. 3E).

Figure 3F:
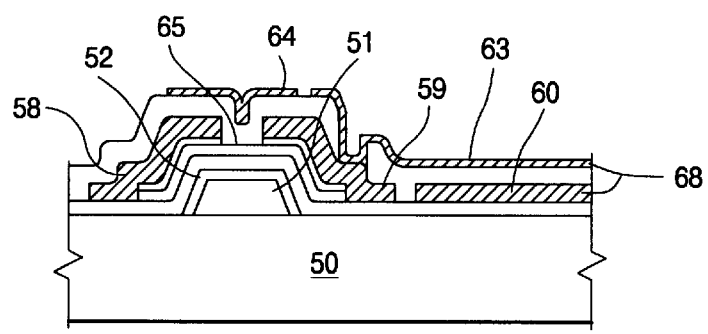

Next, as shown in FIG. 3F, a conductive material such as aluminium or indium tin oxide (ITO) is deposited and patterned through a masking process to form a sensing electrode 63 and a second common electrode 64. The sensing electrode 63 defines the storage capacitor, together with the first common electrode 60, and contacts the drain electrode 59 through the first contact hole 62.

The second common electrode 64 is coupled to the first common electrode 60 through the second contact hole while covering the transistor channel. This will be described in more detail with reference to FIG. 4.

Figure 3G:
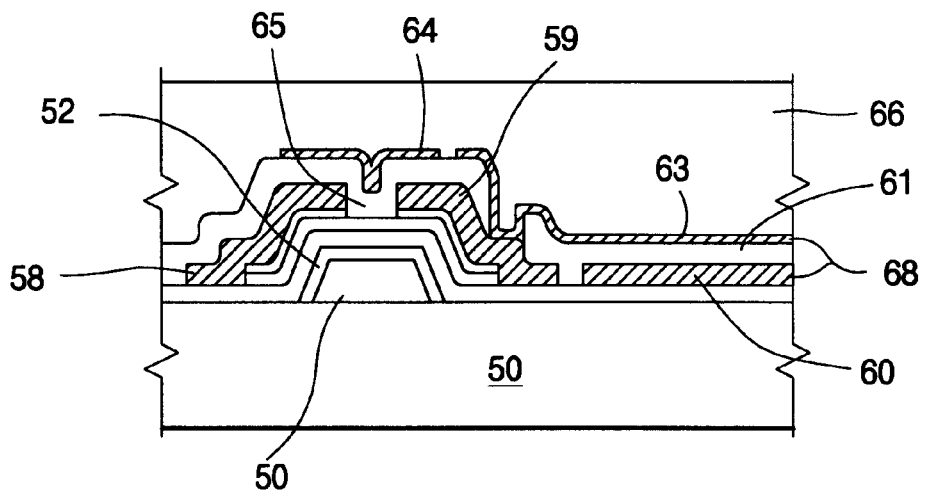

Next, as shown in FIG. 3G, a phosphor material 66 is deposited to be used as a converter for converting an external signal into an electric signal. Preferably, the phosphor material 66 is deposited having a thickness of about 100–500 μm using an amorphous selenium compound. Compounds such as $HgI_2$, $PbO_2$, CdTe, CdSe, thalium bromide or cadmium sulfide may be used as the phosphor material 66. Particularly, an X-ray phosphor material having a relatively high optical conductivity may be used. When X-ray light is transmitted to the phosphor material, electron-hole pairs are generated according to the intensity of the X-ray light.

Figure 3H:
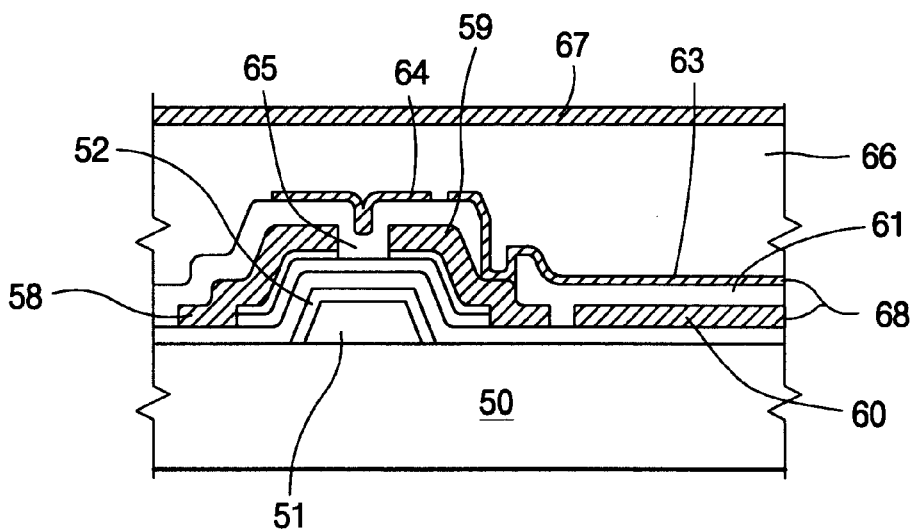

After the phosphor material 66 is deposited, a conductive electrode 67 which can allow the X-ray light to pass therethrough is deposited on the phosphor material 66 (see FIG. 3H). When a voltage is applied to the conductive electrode 67, the electron-hole pairs formed within the phosphor material 66 are collected on the sensing electrode 63, then charges are stored within the storage capacitor 68 by the electron-hole pairs.

Figure 4:
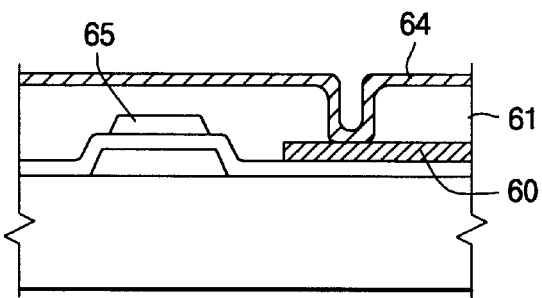
FIG. 4 is a sectional view to illustrate a contacting state of a common electrode.

FIG. 4 shows a sectional view for illustrating a contacting state of the second common electrode.

The second common electrode 64 is coupled to the first common electrode 60 through the second contact hole while partly covering the transistor channel area 65. Since the first common electrode 60 is grounded, the second common electrode 64 coupled to the first common electrode 60 is also grounded.

As shown in FIGS. 3H and 4, the charges generated by the X-ray light may be collected in the second common electrode 64 as well as the sensing electrode 63 of the storage capacitor 68. However, the charges collected in the second common electrode 64 escape to ground through the first common electrode 60 even if the electric potential is high. Accordingly, since the charges are not collected in the transistor channel 65, the TFT may normally perform its switching operation regardless of the charges generated by the X-ray light.

In addition, since there is no relation between the second common electrode 64 and the storage capacitor 68, the leakage current of the TFT can be reduced by reducing the charges induced to the transistor channel 65. The reduction in the leakage current allows the thickness of the insulating layer to be reduced. That is, the thickness of the storage capacitor insulating layer 61 can be reduced to a level suitable for the desired capacity of the capacitor 68. Accordingly, the storage capacitor insulating layer 61 can have a thickness of about 3000 Å using a silicon nitride layer or a silicon oxide layer.

Figure 5:
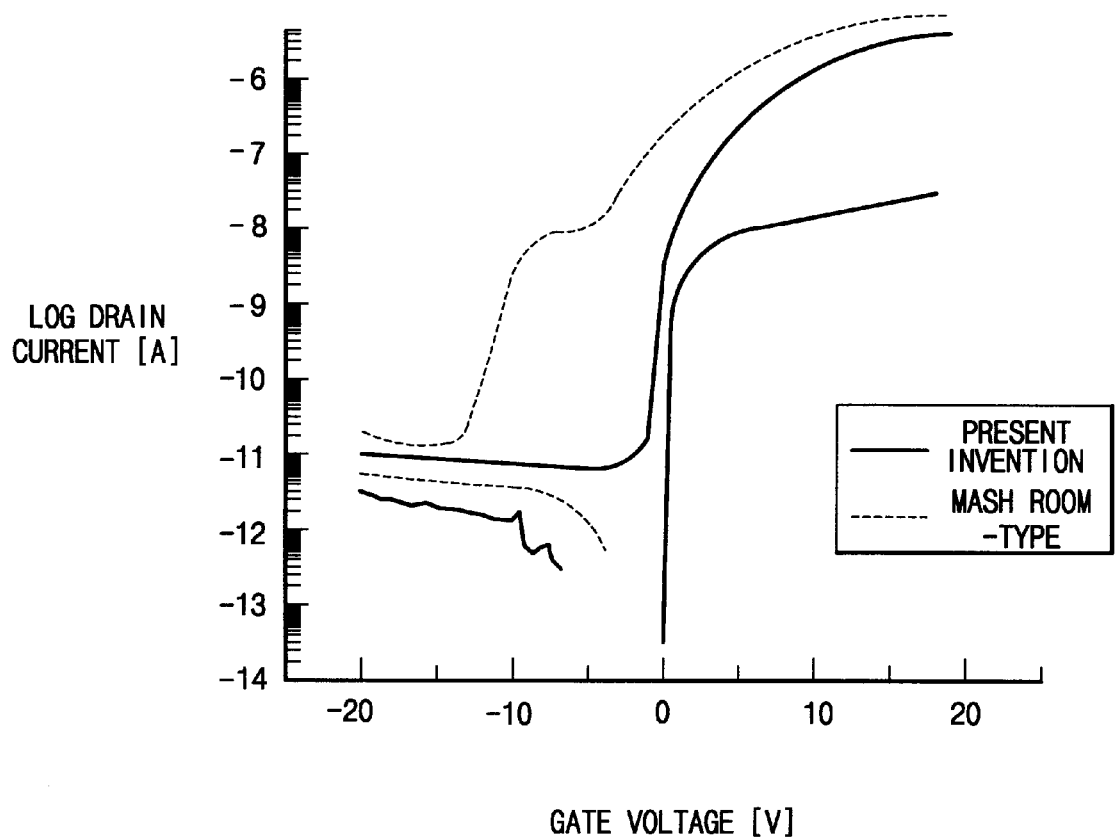
FIG. 5 is a graphical illustration for comparing On-Off characteristics between the conventional art and the present invention.

FIG. 5 shows a graph for comparing On-Off characteristics between the conventional art and a device produced according to the method illustrated with respect to FIGS. 3A–3H.

The graph shows that the TFT device produced according to the method illustrated with respect to FIGS. 3A–3H has a lower leakage current when compared with the conventional TFT, and stably performs the On-Off switching operation.

Figure 1:
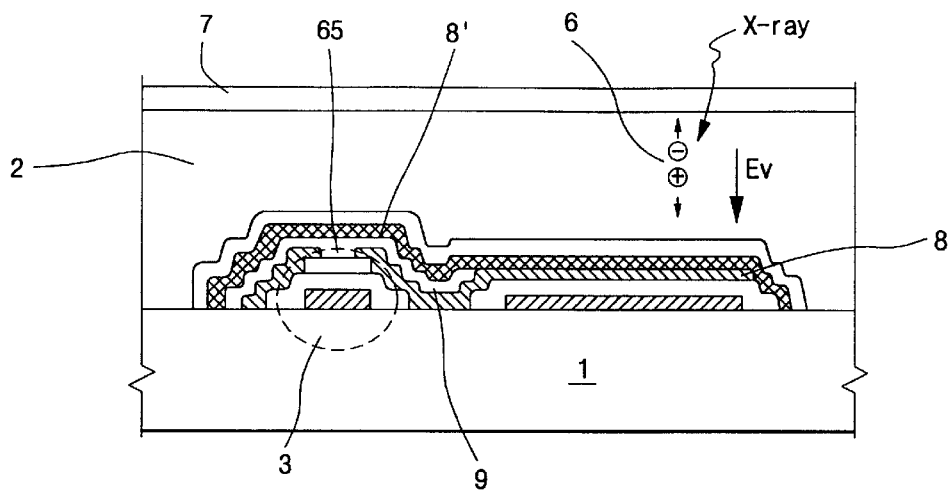
FIG. 1 is a sectional view of a conventional TFT type X-ray image detecting device.
Figure 2:
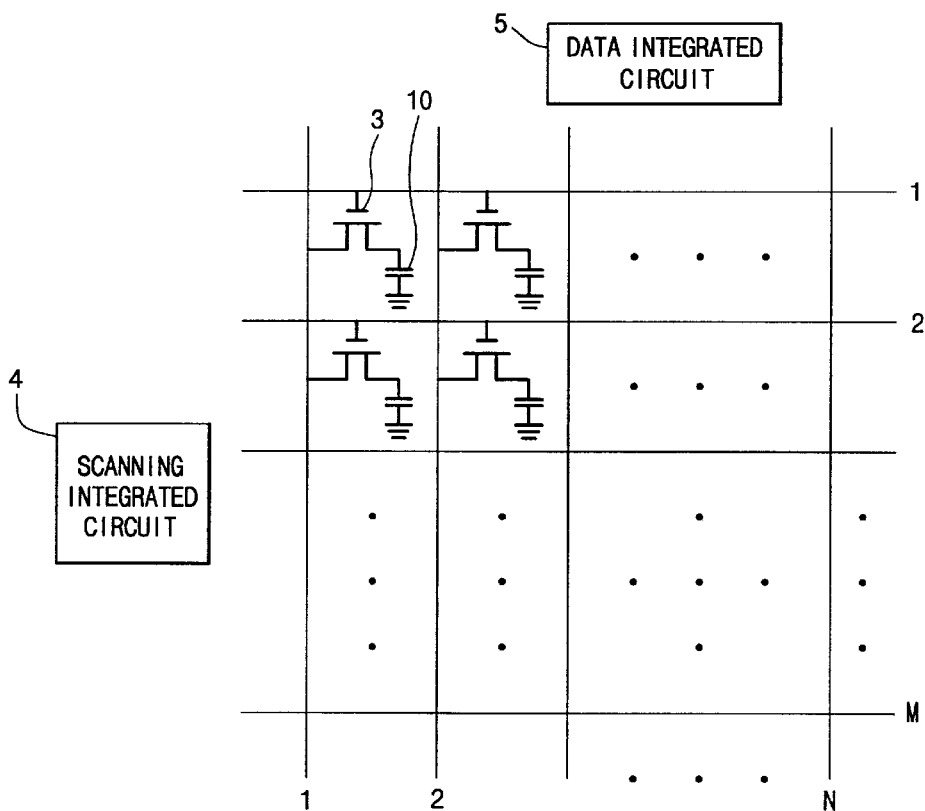
FIG. 2 is a circuit diagram of a conventional X-ray image detecting device.

In the conventional "mushroom-type" TFT shown in FIG. 1, an off-current of about $10^{-10}$ A is generated because of charges generated by X-ray light even when the TFT is in an Off-state. That is, since the charges generated by the X-ray light form a potential in the "mushroom-type" transistor channel, the "mushroom-type" transistor channel functions as a gate electrode, producing a large Off-current. In addition, since an On-current generated by a gate voltage changes smoothly, unstable switching operation occurs at two gate voltages.

In the TFT device produced according to the method illustrated with respect to FIGS. 3A–3H, an Off-current of about $10^{-11}$ A is generated, which is lower than that of the conventional TFT. Accordingly, the On-current changes abruptly with gate voltage, and the On-Off operation accurately occurs, providing a stable switching operation. Accordingly, the charges generated by the X-ray light are stably transmitted to an external system without any leakage.

It will be apparent to those skilled in the art that various modifications and variation can be made in the thin film transistor type x-ray image detecting device and method for fabricating the same of the present invention without departing from the spirit or scope of the invention. Thus, it is intended that the present invention cover the modifications and variations of this invention provided they come within the scope of the appended claims and their equivalents.

What is claimed is:

1. A method for fabricating an X-ray image detecting device, the method comprising;

forming a gate element on a substrate;

forming a gate insulating layer on the substrate and covering the gate element;

forming an ohmic contact layer on a portion of the gate insulating layer above the gate element;

forming source and drain electrodes on the ohmic contact layer simultaneously with forming a first common electrode on the gate insulating layer;

forming a storage capacitor insulating layer on the source and drain electrodes and the first common electrode;

forming a first contact hole through the storage capacitor insulating layer so as to expose a portion of the drain electrode;

forming a second contact hole through the storage capacitor insulating layer so as to expose a portion of the first common electrode;

forming a sensing electrode on the storage capacitor insulating layer, the sensing electrode contacting the drain electrode through the first contact hole; and forming a second common electrode on the storage capacitor insulating layer such that the second common electrode covers the gate element, such that the second common electrode extends over the source and drain electrodes, and such that the second common electrode contacts the first common electrode through the second contact hole.

2. The method of claim 1, further comprising:

forming an optical conductive layer on the sensing electrode and second common electrode; and forming a conductive electrode on the optical conductive layer.

3. The method of claim 2, wherein the optical conductive layer converts an optical signal into an electrical signal.

4. The method of claim 2, wherein the optical conductive layer converts X-ray light into an electrical signal.

5. The method of claim 2, wherein the optical conductive layer comprises an amorphous selenium compound.

6. The method of claim 1, wherein forming the ohmic contact layer further comprises:

forming an amorphous silicon layer on the gate element, and forming a doped amorphous silicon layer on the amorphous silicon layer.

7. The method of claim 1, wherein the first and second common electrodes are grounded.

8. The method of claim 1, wherein the storage capacitor insulating layer is made of an organic material.

9. The method of claim 1, wherein the storage capacitor insulating layer is made of an inorganic material.

10. The method of claim 9, wherein the inorganic material comprises silicon nitride.

11. An X-ray detecting device, comprising:

a gate element on a substrate;

a gate insulating layer on the substrate and covering the gate element;

an ohmic contact layer on a portion of the gate insulating layer adjacent the gate element;

source and drain electrodes on the ohmic contact layer;

a first common electrode on the gate insulating layer;

a storage capacitor insulating layer on the source and drain electrodes and on the first common electrode, the storage capacitor insulating layer having a first contact hole above the drain electrode and a second contact hole above the first common electrode;

a sensing electrode on the storage capacitor insulating layer, the sensing electrode contacting the drain electrode through the first contact hole; and a second common electrode on the storage capacitor insulating layer, wherein the second common electrode extends over the gate element and at least part of the source electrode and at least part of the drain electrode, and wherein the second common electrode contacts the first common electrode through the second contact hole.

12. The X-ray image detecting device of claim 11 further comprising:

an optical conductive layer on the sensing electrode and second common electrode; and a conductive electrode on the optical conductive layer.

13. The X-ray image detecting device of claim 12, wherein the optical conductive layer converts an optical signal into an electrical signal.

14. The X-ray image detecting device of claim 12, wherein the optical conductive layer converts X-ray light into an electrical signal.

15. The X-ray image detecting device of claim 12, wherein the optical conductive layer comprises an amorphous selenium compound.

16. The X-ray image detecting device of claim 11, wherein the ohmic contact layer comprises an amorphous silicon layer on the gate element, and a doped amorphous silicon layer on the amorphous silicon layer.

17. The X-ray image detecting device of claim 11, wherein the first and second common electrodes are grounded.

18. The X-ray image detecting device of claim 11, wherein the storage capacitor insulating layer is made of an organic material.

19. The X-ray image detecting device of claim 11, wherein the storage capacitor insulating layer is made of an inorganic material.

20. The X-ray image detecting device of claim 19, wherein the inorganic material comprises silicon nitride.

21. An image sensing panel, comprising:

a substrate;

a thin film transistor on said substrate, said thin film transistor including a gate electrode, a source electrode, and a drain electrode;

an insulating layer on said substrate and disposed over said gate electrode;

a first common electrode disposed over said insulating layer;

a passivation layer over said thin film transistor and over said first common electrode;

a sensing electrode over said passivation layer and over said first common electrode, whereby a capacitor is formed, said sensing electrode electrically connected to said drain electrode through a first opening in said passivation layer;

a second common electrode over said passivation layer and over said gate electrode, said second common electrode being electrically connected to said first common electrode through a second opening in said passivation layer voltage;

an optically conductive layer over said second common electrode and over said sensing electrode; and a top electrode on said optically conductive layer.

22. The image sensing panel of claim 21, wherein said optically conductive layer converts optical signals into electrical signals.

23. The image sensing panel of claim 21, wherein said optically conductive layer converts X-rays into electrical signals.

24. The image sensing panel of claim 21, wherein said optically conductive layer comprises an amorphous selenium compound.

25. The image detecting device of claim 21, wherein said first and second common are connected to ground.

26. The image detecting device of claim 21, wherein said second common electrode blocks charges from being collected in a channel of said thin film transistor.

27. The image detecting device of claim 21, wherein said gate electrode is tapered.

28. The image detecting device of claim 27, wherein said tapered gate electrode is comprised of an aluminum first layer and a second layer comprised of a metal having a melting point substantially higher than aluminum.

29. The image detecting device of claim 27, wherein said thin film transistor includes an intrinsic silicon layer and a doped silicon layer disposed between said gate electrode and said drain electrode.

\* \* \* \* \*